United States Patent [19]
Aronson

[11] Patent Number: 5,652,809
[45] Date of Patent: Jul. 29, 1997

[54] OFFSET ROTATED TRANSDUCERS FOR ACOUSTO-OPTICAL TUNABLE FILTERS

[76] Inventor: Lewis B. Aronson, 794 Manor Way, Los Altos, Calif. 94024

[21] Appl. No.: 625,614

[22] Filed: Mar. 29, 1996

[51] Int. Cl.⁶ ...................................................... G02F 1/00
[52] U.S. Cl. ................................. 385/7; 385/11; 385/9; 385/8; 359/285; 359/308
[58] Field of Search .................... 385/7, 8, 9, 1, 385/2, 3, 4, 11, 12, 28, 29; 359/285, 286, 287, 305, 308

[56] References Cited

U.S. PATENT DOCUMENTS 5,329,397  7/1994  Chang .................................. 385/7 X

OTHER PUBLICATIONS

Arjun Kar–Roy and Chen S. Tsai, "Focused saw induced sidelobe suppression of integrated acousto–optic tunable wavelenghts filters", IEEE 1992 Ultrasonics Symposium. vol. 1, pp. 169,172 No Month.

Integrated Optical, Te–and TM–Pass, Acoustically Tunable, Double–Stage Wavelength Filters in LiNbO; Hermann, H., et al., Electronic Letters, Mar. 26, 1992, vol. 27, No. 7, pp. 642–644.

L. B. Aronson, G. Rankin, W. R. Trutna, Jr., and D. W. Dolfi, "Reduced sidelobe integrated acouto–optic filter with birefringence apodization"; Optaics Letters, Oct. 15, 1993, vol. 18, No. 20, pp. 1721–1723.

D. A. smith and J. J. Johnson, "Sidelobe suppression in an acousto–optic filer with a raised–cosine interaction strength". Applied Physics Letters, No. 9, vol. 61, Aug. 31, 1993, pp. 1025–1027.

Primary Examiner—Phan T. H. Palmer

[57] ABSTRACT

An acousto-optical filter (AOTF) having reduced sidelobes. The AOTF is fabricated with a waveguide formed on a substrate along an optical axis. An incoming beam of light is coupled into the waveguide. An acoustic wave beam is induced by an interdigitated transducer. The acoustic wave beam follows an acoustic wave beam axis which crosses the optical axis. The transducer is driven by an externally-generated electric signal. The frequency of the acoustic wave beam is determined by the frequency of the electric signal. The acoustic wave beam induces a diffraction grating in the waveguide as the acoustic wave beam crosses the optical axis, and this in turn diffracts the beam of light. The grating couples the transverse electric and transverse magnetic polarization modes of the light, but only within a narrow band of optical wavelengths. The cross-section of the intensity of the acoustic wave beam can be tapered to further reduce the sidelobes of the passband defined by the frequency of surface acoustic wave beam.

6 Claims, 3 Drawing Sheets 5,652,809

OFFSET ROTATED TRANSDUCERS FOR ACOUSTO-OPTICAL TUNABLE FILTERS

FIELD OF INVENTION

This invention relates generally to optical filters. In particular, it relates to rotated transducers in acoustic-optical filters to reduce the level of the sidelobes of the filter response.

BACKGROUND

A theoretically-ideal bandpass filter passes any energy having a frequency within a desired frequency band and blocks any energy having a frequency outside the desired band. For many reasons, theoretically ideal filters cannot be achieved in practice. A good, practically realizable filter is generally considered to be a filter having a response that is essentially flat throughout the desired pass band and that smoothly drops off with either increasing or decreasing frequency outside the pass band. The response of a good realizable bandpass filter is shown in FIG. 1.

An acousto-optic filter ("AOTF") is an electronically tunable optical bandpass filter. Electronically tunable optical filters have been constructed so that an incident light beam of a first polarization is diffracted by an acoustic wave in a birefringent crystal to shift from the first polarization to a second polarization of the light beam for a selected bandpass of optical frequencies. The center wavelength of the passband of this type of filter is electronically tunable by changing the frequency of the acoustic wave within the crystal. Bulk AOTF's fabricated in bulk crystals and using bulk acoustic waves and unguided optical beams have already found many important applications in laser and optics systems. Integrated AOTFs in which light is confined to a waveguide and which use surface acoustic waves are also expected to find important applications in laser and fiber optics systems, especially such as are used in modern telecommunications applications.

As shown in FIG. 2, an integrated AOTF is fabricated in an elongated crystalline substrate 30 such as lithium niobate (LiNbO$_3$). An optical waveguide 34 is formed in an upper surface of the substrate 30, for example by indiffusion of titanium. A beam of light is coupled into the waveguide 34 through an input optical fiber 37. The light/propagates through the waveguide 34 and out through an output optical fiber 39. A surface acoustic wave beam is induced in the waveguide by an interdigitated transducer 32. The transducer is driven by an externally-generated electrical signal from a signal source 35. The frequency of the acoustic wave beam is determined by the frequency of the electrical signal. A pair of acoustic absorbers 38 absorbs acoustic energy produced by the transducer 34.

The acoustic wave beam induces a refractive index grating in the waveguide. The grating couples the transverse electric and transverse magnetic polarization modes of the light, but only within a narrow band of optical wavelengths. Thus, within this narrow band all the light propagating in one polarization mode is converted to the orthogonal mode, whereas outside this band the polarization mode of the light is unaffected A first polarizer 41 adjacent the first extremity of the waveguide 34 blocks any incoming light that is not in a first polarization mode. Thus, only light polarized in the first mode is admitted to the filter. As the light travels through the waveguide, the polarization mode of any light having a wavelength within the narrow band of optical wavelengths is converted to a second mode which is orthogonal to the first mode. The polarization of the rest of the light is unaffected. A second polarizer 43 opposite the first polarizer 41 blocks from the output any light that is not in the second polarization mode. Thus, only light having a polarization mode that has been converted while passing through the filter is allowed to exit the filter. No output destination is shown, but it will be understood that the output light is ultimately provided to a user or to an optical device of some type.

The AOTF passes light having a wavelength within the band determined by the acoustic wave beam and blocks other light. Thus the AOTF serves as a bandpass filter. The center frequency of the pass band can be tuned by changing the frequency of the electrical signal that drives the transducer.

Unfortunately the frequency response of an AOTF is not like that of the good bandpass filter as shown in FIG. 1. Instead, the frequency response of an AOTF is characterized by unwanted sidelobes. In an ideal uniform single stage AOTF, sidelobes are generally less than 9.3 dB below the center frequency. A response curve of a typical AOTF showing the sidelobes is provided in FIG. 3.

A number of techniques have been proposed for sidelobe reduction. Cascading multiple sections has been proposed as one means of reducing sidelobes. If two AOTF section are used the sidelobes can be reduced to about 19 dB below the center frequency. The technique requires the inclusion of an integrated polarizer between the filter sections and results in a wider filter passband than a single filter AOTF of equivalent waveguide length.

Another method of reducing sidelobe levels is to vary the acoustic coupling along the length of the AOTF. A scheme involving directional couplers was described by Smith et al., Applied Physics, Vol. 61, page 1025 (1992), that results in a raised cosine acoustic interaction and is theoretically capable of reducing sidelobes to 17.5 dB below the center frequency per AOTF sectional. This technique has the disadvantage of increasing the 3 dB passband width by a factor of about 1.4 and increasing the acoustic power required by almost four times.

Finally, Trutna et al., Optical Letters, 18, page 1721 (1993), has described a technique for using controlled birefringence to vary phase mismatch as a function of length. This technique requires two AOTF sections and is capable of reducing sidelobes to 30 dB below the center frequency.

All of the above techniques require additional processing steps and require extra costs in the formation of the AOTF. It is desirable to be able to reduce the level of sidelobes in the AOTF frequency response without adding extra process steps to the formation of the AOTF.

SUMMARY OF THE INVENTION

The present invention is an AOTF embodiment that provides reduction in the level of sidelobes. The embodiment of this invention requires no extra steps in the fabrication of the AOTF and can be obtained without added costs.

A first embodiment of this invention includes an acousto-optical filter having a base of acousto-optic material adapted to receive an incoming beam of light. The base comprises an optical waveguide which traverses the base along an optical axis. This embodiment further includes a transducer responsive to an electrical signal to induce an acoustic wave beam in the base. The acoustic wave beam emanates from the transducer along an acoustic wave beam axis. The acoustic wave beam is operable to change the polarization mode of any light propagating through the acoustic wave beam and having a frequency within an optical frequency band defined by the frequency of the acoustic wave beam and the optical properties of the base but not to change the polarization mode of any light having a frequency outside the optical frequency band. Furthermore, the transducer has a center that is offset to a side of the optical axis and the acoustic wave beam axis crosses the optical axis at an oblique angle.

A second embodiment of this invention includes configuring the transducer of the first embodiment so that the intensity of acoustic wave beam has a cross sectional amplitude that is tapered.

Other aspects and advantages of the present invention will become apparent from the following detailed description, taken in conjunction with the accompanying drawings, illustrating by way of example the principles of the invention.

DETAILED DESCRIPTION

Figure 1:
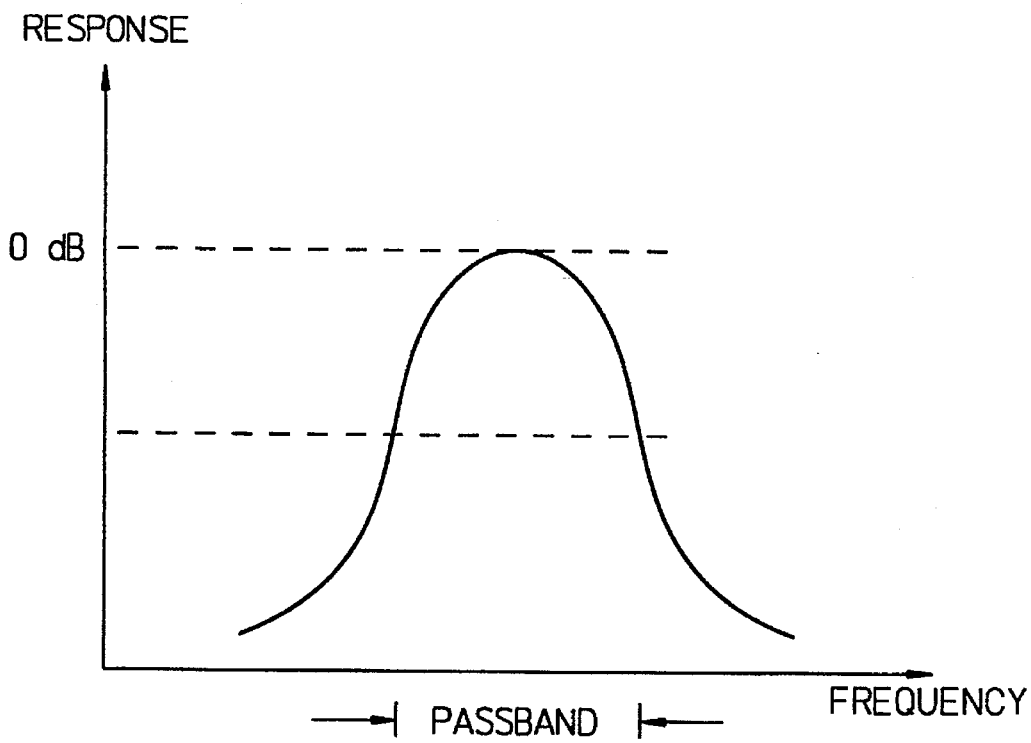
FIG. 1 shows the frequency response of a good-quality, realizable band pass filter.
Figure 2:
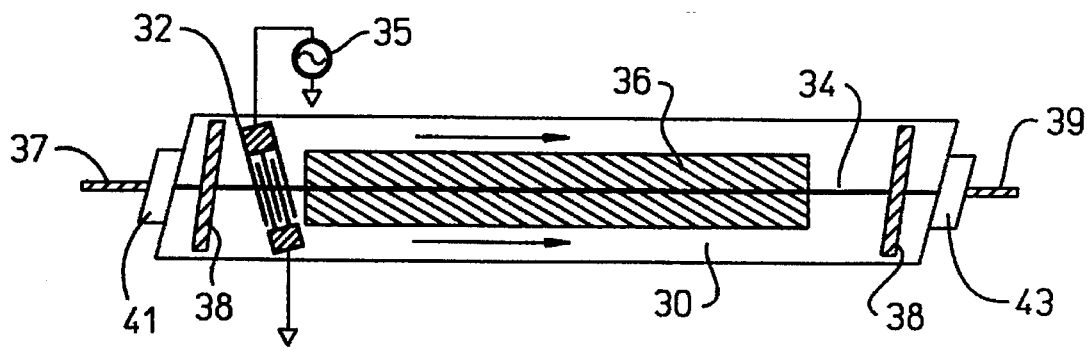
FIG. 2 shows a prior art embodiment of an AOTF.
Figure 3:
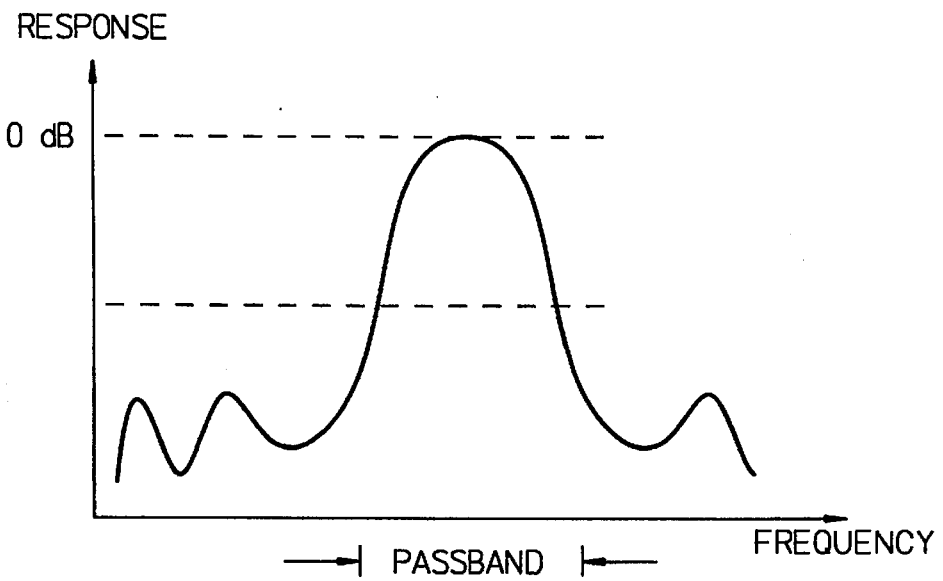
FIG. 3 shows a passband filter response with sidelobes.

As shown in the drawings for purposes of illustration, the invention is embodied in an AOTF system. The AOTF system according to the invention provides better optical signal bandpass filtering performance than previously possible.

Figure 4:
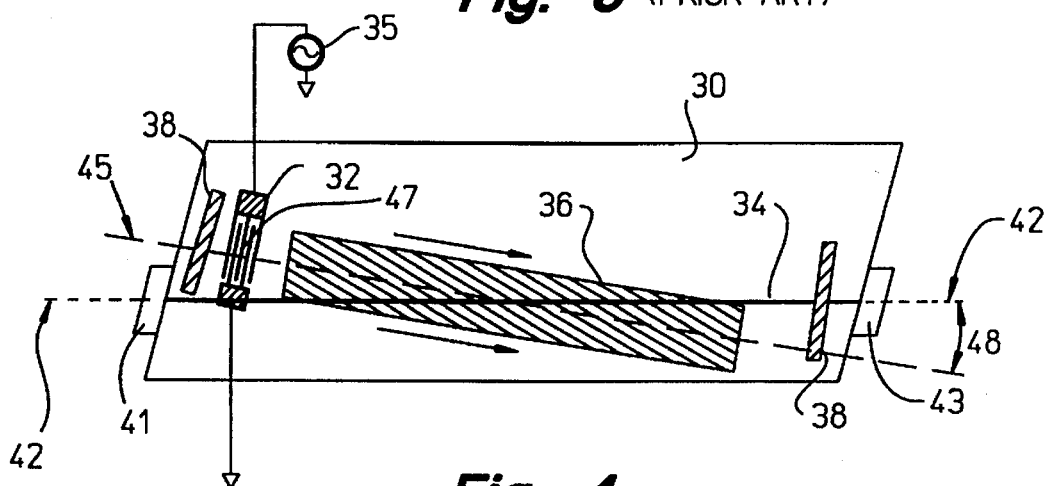
FIG. 4 shows an embodiment of this invention wherein the transducer has been rotated and shifted to reduce sidelobe levels and to enhance the passband.

FIG. 4 shows an embodiment of this invention. A base 30 of acousto-optic material is adapted to receive an incoming beam of light. A first polarizer 41 adjacent the first extremity of the waveguide 34 blocks any incoming light that is not in a first polarization mode. The polarizer 41 is not required if the incoming beam of light is already polarized in the first mode. The base 30 includes an optical waveguide 34 which traverses the base 30 along an optical axis 42. A transducer 32 is responsive to an electrical signal from a signal source 35 to induce an acoustic wave beam 36 in the base 30. The acoustic wave beam 36 emanates from the transducer 32 along an acoustic wave beam axis 45. The acoustic wave beam 36 is operable to change the polarization mode of any light propagating through the acoustic wave beam 36 and having a frequency within an optical frequency band defined by the frequency of the acoustic wave beam 36 and the optical properties of the base 30 but not to change the polarization mode of any light having a frequency outside the optical frequency band. The polarization mode of any light having a frequency within the optical frequency is converted to a second mode which is orthogonal to the first mode. The polarization of the rest of the light is unaffected. A second polarizer 43 opposite the first polarizer 41 blocks from the output any light that is not in the second polarization mode. Thus, only light having a polarization mode that has been converted while passing through the filter is allowed to exit the filter. The transducer 32 has a center 47 that is offset to a side of the optical axis 42 and the acoustic wave beam axis 45 crosses the optical axis 42 at an oblique angle 48.

The advantage of this arrangement is that the acoustic power of the acoustic wave beam 36 walks on an then off the waveguide providing a very inexpensive form of amplitude apodization which reduces the sidelobe levels. (Apodization is a standard term in the art of imaging optics which indicates that a pupil function is appropriately modified to partially maxima. The term has been adapted in the field of coupled wave theory for filters, which is used in the analysis of AOTFs, to indicate modifications in the amplitude or phase coupling constants for the purpose of suppressing secondary maxima in the filter function.) Experimentally, AOTFs with the transducer 32 offset and rotated yield sidelobe levels that are about 2 dB lower than the sidelobes of AOTFs that do not have the transducer 32 offset from the waveguide. This amount of sidelobe reduction may appear to be small but in reality can significantly increase the yield of AOTFs that must be manufactured with specific performance characteristics.

Experimentally, the drawbacks of this invention are very small. The AOTF embodiment of this invention requires a slightly larger amount of acoustic power and the passband of the filter is slightly increased.

Metal structures like the transducer 32 formed over the waveguide 34 tend to increase the optical loss of the waveguide 34. Therefore, offsetting the transducer 32 so that the transducer 32 is not located over the waveguide 34 reduces the optical loss of the waveguide 34. This is particularly useful in multisection AOTFs that have two or three transducers. The metal structures of the multiple transducers formed over the waveguide 34 can cause optical losses of up to 2–3 dB.

The transducer 32 emanates a forward acoustic wave and a backward acoustic wave. It is intended that the forward acoustic wave interact with the optical beam of light that travels down the waveguide 34. The backward acoustic wave is absorbed by the acoustic absorber 38. If the transducer 32 is located over the waveguide 34, then the backward acoustic wave also interacts with the optical beam of light. The backward acoustic wave Doppler shifts the frequency of the optical beam. The forward acoustic wave also Doppler shifts the frequency of the optical beam but in the opposite direction as the backward acoustic wave. As a result, the filtered optical beam at the output of the AOTF will have undesired harmonics of the fundamental frequency of the unfiltered optical beam at the input of the AOTF.

By not locating the transducer 34 physically over waveguide 34, the acoustic absorber 38 adjacent to the transducer 32 can also be located so that the acoustic absorber 38 is not physically over the waveguide 34. The acoustic absorber 38 increases in temperature as the acoustic absorber 38 absorbs the acoustic wave induced by the transducer 32. If the acoustic absorber is located over the waveguide 34, then heat gradients are formed on the substrate where the waveguide 34 has been formed. The heat gradients change the phase matching of the waveguide 34 which increases the sidelobes of the AOTF frequency response.

The degree that amplitude apodization occurs in the AOTF is strongly correlated to the cross-sectional intensity of the acoustic wave beam 36 formed by the transducer 32.

Figure 5:
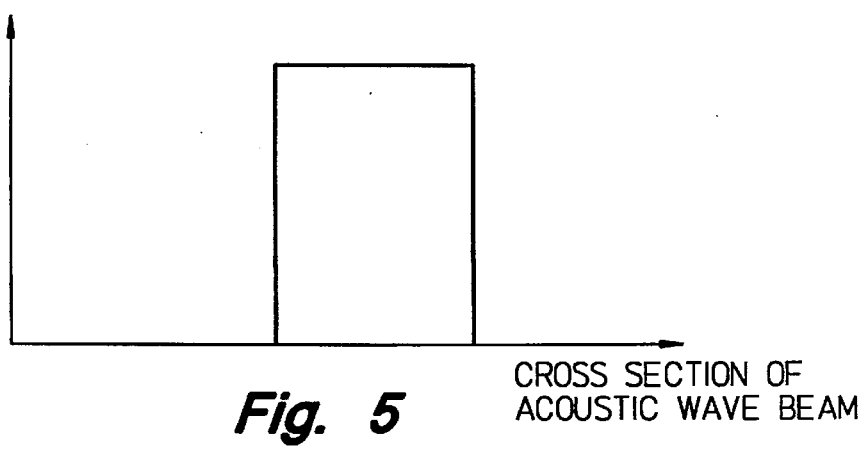
FIG. 5 the cross-section of the beam intensity of a stepped acoustic wave beam of the embodiment shown in FIG. 4.

The transducer 32 shown in FIG. 4 will have an approximately rectangular acoustic wave beam cross-sectional intensity. FIG. 5 shows an approximation of the cross-section of the intensity of the acoustic wave beam 36 formed by the transducer 32 shown in FIG. 4.

Figure 6:
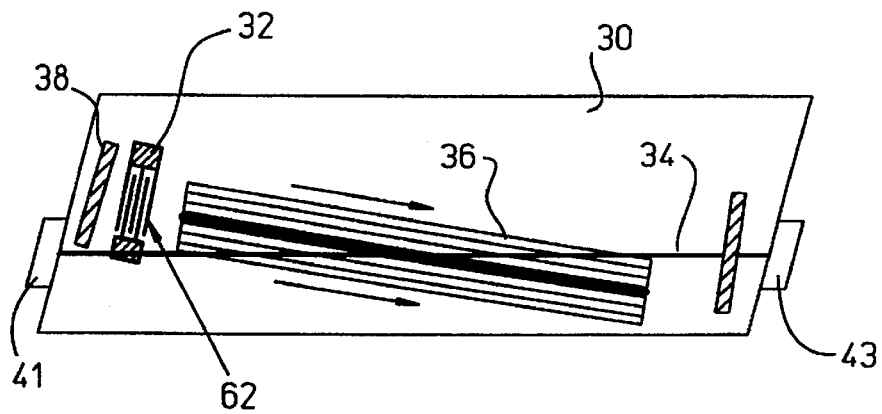
FIG. 6 shows another embodiment of this invention in which the transducer fingers have been manipulated to taper the intensity of the acoustic wave beam.

FIG. 6 shows another embodiment of this invention. In this embodiment, the fingers 62 of the transducer 32 have been altered in length and the orientation of the individual fingers with respect to each other has been varied. By making these alteration and variances in the fingers 62, the cross section of the intensity of the acoustic wave beam created by the transducer 32 can be manipulated. Techniques for manipulating the intensity of acoustic wave beams emanating from a transducer on a substrate have been well developed in the field of surface acoustic wave (SAW) filters.

Figure 7:
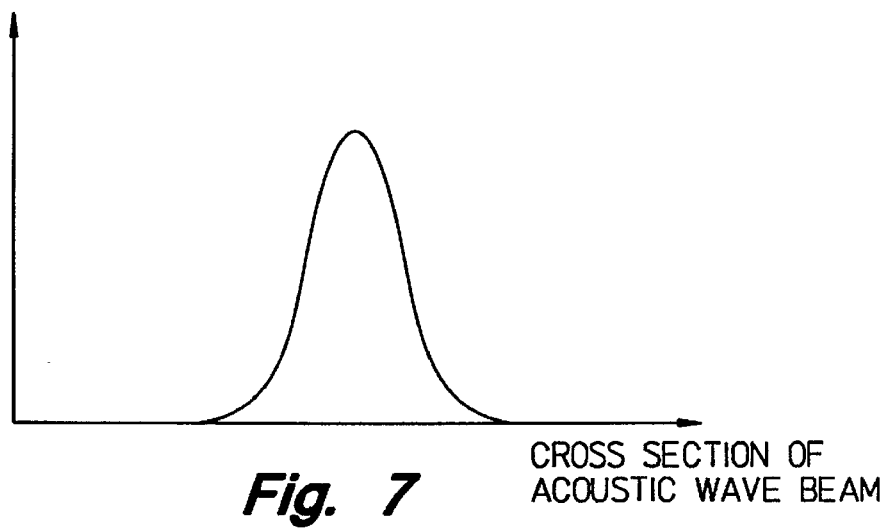
FIG. 7 shows the cross-section of the beam intensity of a stepped acoustic wave beam of the embodiment shown in FIG. 6.

FIG. 7 shows the cross section of the intensity of the acoustic wave beam created by the transducer 32 of FIG. 6. The shape of this cross section is more gradual than the cross section shown in FIG. 5. This cross section is of a Gaussian like shape. As this acoustic wave beam 36 crosses the waveguide 34 the acoustic-optic interaction will smoothly rise and fall along the length of the waveguide 34 resulting in sidelobe reduction of the AOTF filter frequency response.

Although specific embodiments of the invention have been described and illustrated, the invention is not to be limited to the specific forms or arrangements of parts so described and illustrated. The invention is limited only by the claims.

We claim:

1. An acousto-optical filter comprising:

a base of acousto-optic material adapted to receive an incoming beam of light, the base comprising an optical waveguide which traverses the base along an optical axis; and a transducer responsive to an electrical signal to induce an acoustic wave beam in the base, the acoustic wave beam emanating from the transducer along an acoustic wave beam axis, and the acoustic wave beam operable to change the polarization mode of any light propagating through the acoustic wave beam and having a frequency within an optical frequency band defined by the frequency of the acoustic wave beam and the optical properties of the base but not to change the polarization mode of any light having a frequency outside the optical frequency band; wherein the transducer has a center that is offset to a side of the optical axis and the acoustic wave beam axis crosses the optical axis at an oblique angle.

2. The acousto-optical filter as recited in claim 1, wherein the transducer has an outer perimeter which is offset to a side of the optical axis.

3. The acousto-optical filter as recited in claim 1, wherein the transducer has a plurality of fingers and the fingers are configured so that the acoustic wave beam emanating from the transducer has a cross sectional amplitude that is stepped.

4. The acousto-optical filter as recited in claim 1, wherein the transducer has a plurality of fingers and the fingers are configured so that the acoustic wave beam emanating from the transducer has a cross sectional amplitude that is tapered.

5. The acousto-optical filter as recited in claim 1, wherein the optical axis has a center point and the acoustic wave beam crosses the optical axis at the center point.

6. The acousto-optical filter as recited in claim 1, further comprising an acoustic absorber located on the same side of the optical axis as the transducer and located to absorb acoustic waves emanating from the transducer that do not cross the optical axis.

* * * * *